United States Patent Office 3,700,470
Patented Oct. 24, 1972

3,700,470
FOAMED CERAMIC MATERIAL AND METHOD OF MAKING THE SAME
Patrick William Barton, Elanora Heights, New South Wales, Australia, assignor to A.C.I. Operations Pty. Limited, Melbourne, Victoria, Australia
No Drawing. Filed Aug. 31, 1970, Ser. No. 68,556
Claims priority, application Australia, Sept. 2, 1969, 60,332/69
Int. Cl. B29d 27/04; C04b 37/10
U.S. Cl. 106—75
10 Claims

ABSTRACT OF THE DISCLOSURE

Lightweight foamed solid shapes, e.g. building panels are made by mixing a ceramic filler, a powdered amphoteric metal, preferably aluminum, and aqueous sodium silicate, shaping the mix and subsequently curing it with or without facing sheets. Use of waste ceramic materials, especially power station fly ash, is preferred.

---

This invention relates to a light weight foamed solid material and process for its manufacture. The material has, inter alia, insulating properties making it highly suitable for use in building panels.

The product of the invention exhibits substantial advantages in raw material costs, physical properties and ease and economy of manufacture over materials formerly available for this purpose.

The basic formulation of the product according to the invention includes a ceramic material as a filler, sodium silicate, an amphoteric metal in powdered form, and water. The ceramic materials are preferably in finely divided or granulated form. Ceramic waste products are suitable. A clay such as Bentonite or Kaolinite may be added as extender.

It is known to make lightweight foamed solid shapes by preparing a mix containing a filler, a binder, water and a foaming agent, shaping the mix and subsequently curing it.

The present invention provides a novel process and product in that the mix contains a ceramic filler, an amphoteric metal in powdered form, sodium silicate and water.

In the alkaline medium the amphotoric metal reacts with part of the sodium silicate to liberate hydrogen which accomplishes the foaming action and forms a foamed ceramic in the green state. The green foamed ceramic is then heated to further improve its physico/mechanical properties.

Suitable ceramic materials include Power Station Fly Ash, Blast Furnace Slag, Pumice, Red Mud Wastes and Sand Fines. Power station fly ash is a preferred material and especially preferred is fly ash derived from power stations burning black coal. When fly ash derived from brown coal is employed in the process of the present invention, a pretreatment step is included, as will be described in more detail below.

Suitable amphoteric metals include aluminum, zinc, lead, tin and chromium. It is particularly preferred to use finely powdered aluminum, for example, as used in paint pigments.

In addition to its function as an active agent reacting with the metal powder, the sodium silicate also serves as a binder. Preferably the soda/silica ratio is chosen in the range 1:3.3 to 1:2.0 by weight, although slightly higher or lower ratios are also suitable.

Expressed as percentages by weight of total solids the preferred formulation may comprise:

Ceramic material, 60 to 80% and more preferably 65 to 75%;
Sodium silicate, 40 to 20% and more preferably 35 to 25%;
Amphoteric metal, 0.05% to 0.4% and more preferably 0.1 to 0.3 and even more preferably 0.1% to 0.2%;
Water, 30 to 60% (by weight of total *solids*), more preferably 45 to 60% and even more preferably 48.5 to 53.5%.

Although the ceramic material is referred to as a "filler" it will be clearly understood that a part thereof may undergo chemical reaction during the process of the invention and no limitation shall be inferred herein to any particular theoretical reaction mechanism.

If desired the temperature of the mix may be raised, for example, to a temperature between ambient and 100° C., in order to initiate the reaction between the active agent and the amphoteric metal.

Depending upon the final form desired, the mix may be poured into a mould, or onto a flat surface, for example, paper, metal, or phenolic laminate veneer (which may ultimately serve a dual function as a reinforcement, and a surface finish for painting, etc.), or extruded. When certain facing sheets are employed, for example, paper or aluminum foil, the mixture adheres firmly thereto and no adhesive is necessary.

Processing conditions can be controlled to give a preferred final bulk density of 10 lbs./cu. ft. to 70 lbs./cu. ft. in the ceramic core.

Viscosity control of the slurry may also be employed as a factor in controlling the final structure and strength.

The temperature to which the green foamed ceramic is raised is suitably in the range 80° to 200° C., although for certain products, for example, refractory bricks, the upper temperature may be up to 700° C. or even higher. As a result of this step the product exhibits improved compressive strength, tensile strength, modulus of rupture in bending, and amount of flexure at fracture.

Lightweight foamed ceramic materials according to the invention exhibit superiority over existing materials in low thermal conductivity, low density, increasing mechanical integrity with temperature, and low cost.

The invention will be further illustrated by the following embodiments which are not to be taken as limiting the general nature of the invention as hereinbefore described.

In the following Examples 1 to 7 the ceramic material was fly ash obtained from Wangi power station in New South Wales, Australia, which is a black-coal burning plant. Experimental work has shown that fly ash derived from black-coal burning plants in various locations exhibits similar properties and may be employed in the process of this invention without pretreatment. Examples 8 to 12 employ fly ash obtained from other black-coal-burning power stations. Example 13 illustrates employment of fly ash from Mere Mere power station in New Zealand, which burns brown coal. The fly ash derived from brown coal contains soluble alkaline salts and is pretreated to pre-precipitate the soluble fraction before being used in the process of this invention.

Throughout the examples the modulus of rupture (M.O.R.) quoted is a 3-point bend test taken from Australian Standards Nos. A.44 and C.20—1960 "Fibrous Plaster Products."

The thickness of the composite boards produced in Examples 1 to 14 inclusive was in each case approximately one-half inch.

EXAMPLE 1

A solution consisting of 680 parts of sodium silicate and water, having a solids content of 39.6% by weight, and $Na_2O:SiO_2::1:2.30$ by weight was heated to 65° C. This hot solution was then added to a mixture of 500 parts fly ash and 1 part finely divided aluminum by weight. The resulting slurry was contained between two sheets of paper and cured at 100° C. for 16 hours.

The resulting composite had a bulk density of 53.6 lb./ft.$^3$ and an M.O.R. of 1,657 p.s.i.

EXAMPLE 2

A solution of 524 parts of sodium silicate and water, having a solids content of 31.8% by weight, and $Na_2O:SiO_2::1:2$ by weight was heated to 65° C. then added to a mix containing 500 parts of fly ash and 1 part finely divided aluminum by weight. The resulting slurry was contained between two sheets of paper and cured at 80° C. for 16 hours.

The cured composite had a bulk density of 49.7 lb./ft.$^3$ and an M.O.R. of 1,106 p.s.i.

EXAMPLE 3

A solution consisting of 524 parts of sodium silicate and water, having a solids content of 31.8% by weight and $Na_2O:SiO_2::1:2.3$ was heated to 50° C. and then added to a mixture of 500 parts of fly ash and 2 parts of finely divided aluminium by weight.

The resulting slurry was then cast between two sheets of paper and cured at 80° C. for 16 hours.

The cured composite had a bulk density of 65.5 lb./ft.$^3$ and an M.O.R. of 1,446 p.s.i.

EXAMPLE 4

A solution of 682 parts sodium silicate and water, having a solids content of 39.6% by weight, and $Na_2O:SiO_2::1:2$ was heated to 65° C. The hot solution was added to a mix consisting of 500 parts of fly ash and 1 part finely divided aluminium by weight.

The resulting slurry was cast between two sheets of paper and cured at 100° C. for 16 hours.

The cured composite had a bulk density of 40.3 lb./ft.$^3$ and an M.O.R. of 1,990 p.s.i.

EXAMPLE 5

A dry mixture of 720 parts of Wangi fly ash and 2.88 parts of Alcoa atomized powdered aluminum No. 123 was added with stirring to aqueous sodium silicate at 90° C. The aqueous sodium silicate was a mixture of 508.4 parts sodium silicate solution in water having a solids content of 47.2% and $Na_2O:SiO_2::1:2.21$ by weight and 245.2 parts of extra water.

This was then poured onto a bottom sheet of 0.021 inch liner board and a top sheet then applied, the top sheet being 0.040 inch thick paper which had been coated on the outer surface with 0.0006 inch polyethylene film. The composite was placed in an oven at 100° C. for 16 hours. Foaming commences upon mixing and continues during at least part of the curing cycle in the oven. After curing the composite had a bulk density of 40 lbs./ft.$^3$.

EXAMPLE 6

A dry mixture of 500 parts of Wangi fly ash and 2 parts of Alcoa atomized powdered aluminum No. 123 was added with stirring to aqueous sodium silicate at 65° C. The aqueous sodium silicate was a mixture of 299 parts of sodium silicate solution in water having a solids content of 55.3% and $Na_2O:SiO_2::1:1.96$ by weight and 224 parts of extra water.

This was then poured onto a bottom sheet of 0.021 inch liner board and a similar top sheet then applied. The composite was placed in an oven at 100° C. for 16 hours.

After curing the composite had a bulk density of 44.8 lbs./ft.$^3$ and an M.O.R. of 1332 p.s.i.

EXAMPLE 7

A dry mixture of 600 parts of Wangi fly ash and 2.42 parts of Alcoa atomized powdered aluminum No. 123 was added with stirring to aqueous sodium silicate at 85° C. The aqueous sodium silicate was a mixture of 423.7 parts sodium silicate solution in water having a solids content of 47.2% and $Na_2O:SiO_2::1:2.21$ by weight and 204.3 parts of extra water.

This was then poured onto a bottom sheet of 0.021 inch liner board and a similar top sheet then applied. The composite was placed in an oven at 100° C. for 16 hours.

After curing the composite had a bulk density of 43.5 lbs./ft.$^3$ and an M.O.R. of 1185 p.s.i.

EXAMPLE 8

To a mixture consisting of 660 parts of fly ash from Tallawarra power station in New South Wales, Australia (a black-coal burner) and 2.64 parts of Alcoa atomized aluminum powder No. 123 was added a mixture consisting of 466.1 parts of aqueous sodium silicate having a solids content of 47.2% by weight and $Na_2O:SiO_2::1:2.21$ by weight and 224.7 parts of extra water, the aqueous mixture being at 90° C.

This was then poured onto a bottom sheet of 0.021 inch liner board and a similar top sheet then applied. The composite was placed in an oven at 100° C. for 16 hours.

On curing the composite board had a bulk density of 53.1 lbs./ft.$^3$ and an M.O.R. of 752 p.s.i.

EXAMPLE 9

To a mixture consisting of 660 parts of fly ash from Wallerawang Power station in New South Wales, Australia (a black-coal burner) and 2.64 parts of Alcoa atomized aluminum powder No. 123 was added a mixture consisting of 466.1 parts of aqueous sodium silicate having a solids content of 47.2% by weight and $Na_2O:SiO_2::1:2.21$ by weight and 224.7 parts of extra water, the aqueous mixture being at 90° C.

This was then poured onto a bottom sheet of 0.021 inch liner board and a similar top sheet then applied. The composite was placed in an oven at 100° C. for 16 hours.

On curing this composite board had a bulk density of 52.1 lbs./ft.$^3$ and an M.O.R. of 623 p.s.i.

EXAMPLE 10

To a mixture consisting of 660 parts of fly ash from Vales Point power station in New South Wales, Australia (a black-coal burner) and 2.64 parts of Alcoa atomized aluminum powder No. 123 was added a mixture consisting of 466.1 parts of aqueous sodium silicate having a solids content of 47.2% by weight and $Na_2O:S.O_2::1:2.21$ by weight and 224.7 parts of extra water, the aqueous mixture being at 90° C.

This was then poured onto a bottom sheet of 0.021 inch liner board and a similar top sheet then applied. The composite was placed in an oven at 100° C. for 16 hours.

On curing this composite board had a bulk density of 37.8 lbs./ft.$^3$ and an M.O.R. of 651 p.s.i.

EXAMPLE 11

To a mixture consisting of 600 parts of Vales Point power station fly ash and 2.4 parts of Alcoa atomized aluminum powder No. 123 was added an aqueous sodium silicate solution at 90° C. consisting of 390.2 parts of sodium silicate which was 51.25% solids in water by weight, the solids having $Na_2O:SiO_2::1:2.09$ and 117.8 parts of additional water.

This was then poured onto a bottom sheet of 0.021 inch liner board and a similar top sheet then applied. The composite was placed in an oven at 100° C. for 16 hours.

On curing this composite board had a bulk density of 42.2 lbs./ft.$^3$ and an M.O.R. of 701 p.s.i.

EXAMPLE 12

To a mixture consisting of 600 parts of Vales Point power station fly ash and 2.4 parts of Alcoa atomized aluminum powder No. 123 was added an aqueous solution at 90° C. consisting of 400.8 parts of sodium silicate which was 49.9% solids in water the solids having $Na_2O:SiO_2::1:2.13$ and 107.2 parts of additional water.

This was then poured onto a bottom sheet of 0.021 inch liner board and a similar top sheet then applied. The composite was placed in an oven at 100° C. for 16 hours.

On curing this composite board had a bulk density of 41.8 lbs./ft.$^3$ and an M.O.R. of 592 p.s.i.

EXAMPLE 13

To a mixture of 750 parts of −30 mesh British Standard Specification, fly ash from Mere Mere Power Station in New Zealand (a brown coal burner) and 37 parts of sodium carbonate was added 400 parts of water. This mixture was then moiled down to a combined weight of 1048.2 parts.

This mixture was then added to 476.1 parts of aqueous sodium silicate solution which was 55.3% solids by weight and had $Na_2O:SiO_2::1:1.96$ by weight and was at a temperature of 70° C. 3.0 parts of Alcoa atomized aluminum powder No. 123 was then added and mixed in with the above ingredients. This was then poured onto a bottom sheet of 0.021 inch liner board and a similar top sheet then applied. The composite was placed in an oven at 100° C. for 16 hours.

On curing this composite board had a bulk density of 48 lbs./ft.$^3$ and an M.O.D. of 476 ps.i.

EXAMPLE 14

This example illustrates the low thermal conductivity of a material produced according to the invention.

A dry mixture of 500 parts of Wangi fly ash, 26.7 parts Home Rule Clay and 2.0 parts of Alcoa atomized aluminum powder No. 123 was added with stirring to aqueous sodium silicate at 90° C. The aqueous sodium silicate was a mixture of 297.2 parts sodium silicate solution in water having a solids content of 47.2% and $Na_2O:SiO_2::1:2.21$ by weight and 233.3 parts extra water.

This was cast into an octagonal sided mould approximately 2″ deep.

The octagonal sided sample was cured at 100° C. for 16 hours and fired at 800° C. for 16 hours. The sample then had a bulk density of 44 lbs./ft.$^3$.

This sample had the following measured thermal conductivity:

Mean temperature ° F. _____ 295
Thermal conductivity K. B.t.u./ft.$^2$/inch/hr./° F. __ 131

The present invention utilizes cheap and readily aviailable ceramic materials as a filler. Such materials include fly ash, ground pumice, red mud wastes, sand fines and blast furnace slags. Apart from the obvious advantage of a much lower absolute cost, there is also an economic advantage in the sense of general availability. For instance in certain localties there is a surplus of waste materials of the type utilized in the present invention and their disposal is a problem.

Further because of the finely divide form of these materials, they are ideally suited for the manufacture of ceramic insulating products in the form of boards, bricks or extrusions.

I claim:

1. A method of making lightweight foamed solid shapes, comprising preparing a mix consisting essentially of

| | Percent |
|---|---|
| Ceramic filler | 60–80 |
| Sodium silicate | 20–40 |
| Amphoteric metal powder | 0.05–0.4 |
| Water | 30–60 | by weight of the total solids, whereby the amphoteric metal powder reacts with part of the sodium silicate to liberate hydrogen that expands the mix, shaping the mix, and curing the shaped mix by heating at a temperature of at least about 80° C. to produce a lightweight foamed solid product, said ceramic filler being a member selected from the group consisting of power station fly ash, blast furnace slag, pumice, red mud wastes and sand fines, said amphoteric metal being selected from the group consisting of aluminum, zinc, lead and tin.

2. Method according to claim 1 in which the ceramic filler is power station fly ash and the amphoteric metal is aluminum.

3. Method according to claim 2 in which fly ash derived from black coal is mixed with powdered aluminum to form a dry mixture which is added to aqueous sodium silicate to form a slurry, and the slurry is shaped and subsequently cured to produce a lightweight foamed solid product.

4. Method according to claim 2 in which fly ash derived from brown coal is pretreated to pre-precipitate its soluble fraction then mixed with aqueous sodium silicate and powdered aluminum to form the mix which is shaped and subsequently cured.

5. Method according to claim 4 in which the fly ash derived from brown coal is pretreated with aqueous sodium carbonate.

6. Method according to claim 1, in which the mix comprises by weight of total solids:

| | Percent |
|---|---|
| Ceramic filler | 65–75 |
| Sodium silicate | 35–25 |
| Amphoteric metal | 0.1–0.3 |
| Water | 45–60 |

7. Method according to claim 1, in which the mix is shaped by casting in a mould.

8. Method according to claim 1 in which the mix is shaped by pouring onto a facing sheet of suitable material which is retained in the final product.

9. Method according to claim 8 in which a second facing sheet is added to produce a final product faced on two opposite sides.

10. A lightweight foamed solid product produced by the method of claim 1.

References Cited

UNITED STATES PATENTS

| | | | |
|---|---|---|---|
| 2,664,405 | 12/1953 | Andersen et al. | 106—75 X |
| 3,230,103 | 1/1966 | Minnick | 106—117 |
| 1,519,311 | 12/1924 | Johnson | 264—42 X |
| 3,150,988 | 9/1964 | Dess et al. | 264—42 UX |
| 3,184,371 | 5/1965 | Seidl | 264—42 X |
| 3,203,813 | 8/1965 | Gajarde et al. | 264—42 UX |

FOREIGN PATENTS

| | | | |
|---|---|---|---|
| 153,684 | 10/1963 | U.S.S.R. | 264—42 |
| 365,154 | 1/1932 | Great Britain | 264—42 |
| 421,940 | 1/1935 | Great Britain | 264—42 |
| 695,795 | 8/1953 | Great Britain | 264—42 |

PHILIP E. ANDERSON, Primary Examiner

U.S. Cl. X.R.

106—40, 84; 161—159, 160; 264—42, 45, 234, 233, DIG. 43, DIG. 49, DIG. 63